Feb. 14, 1933.                G. A. MILLAR                1,897,640
                    APPARATUS FOR WORKING FUSED SILICA
              Filed Dec. 27, 1928           3 Sheets-Sheet 3
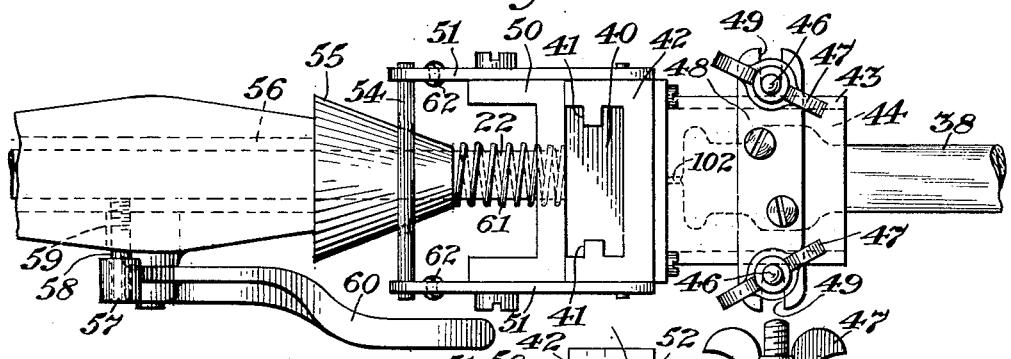
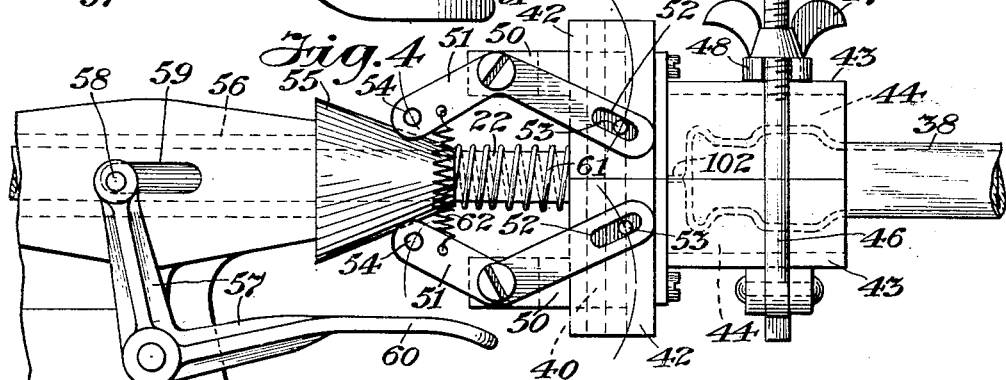
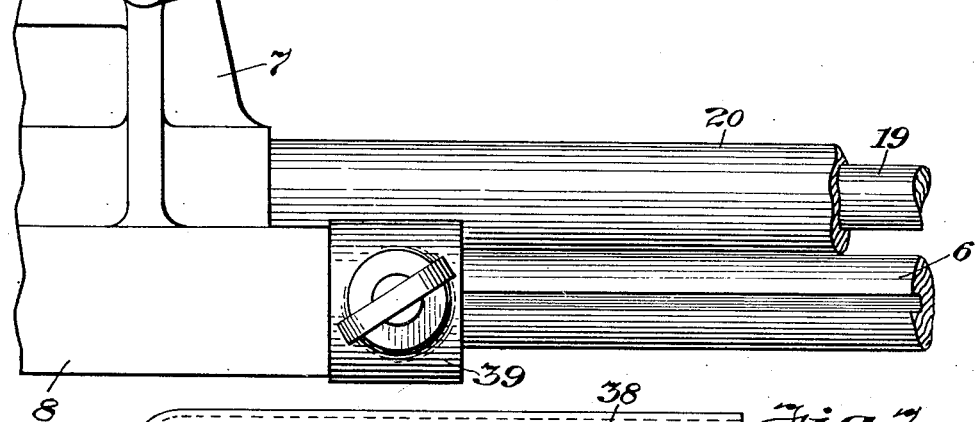
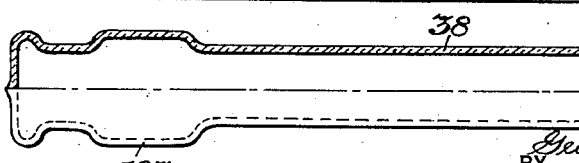
INVENTOR
George A. Millar
BY
HIS ATTORNEY Patented Feb. 14, 1933

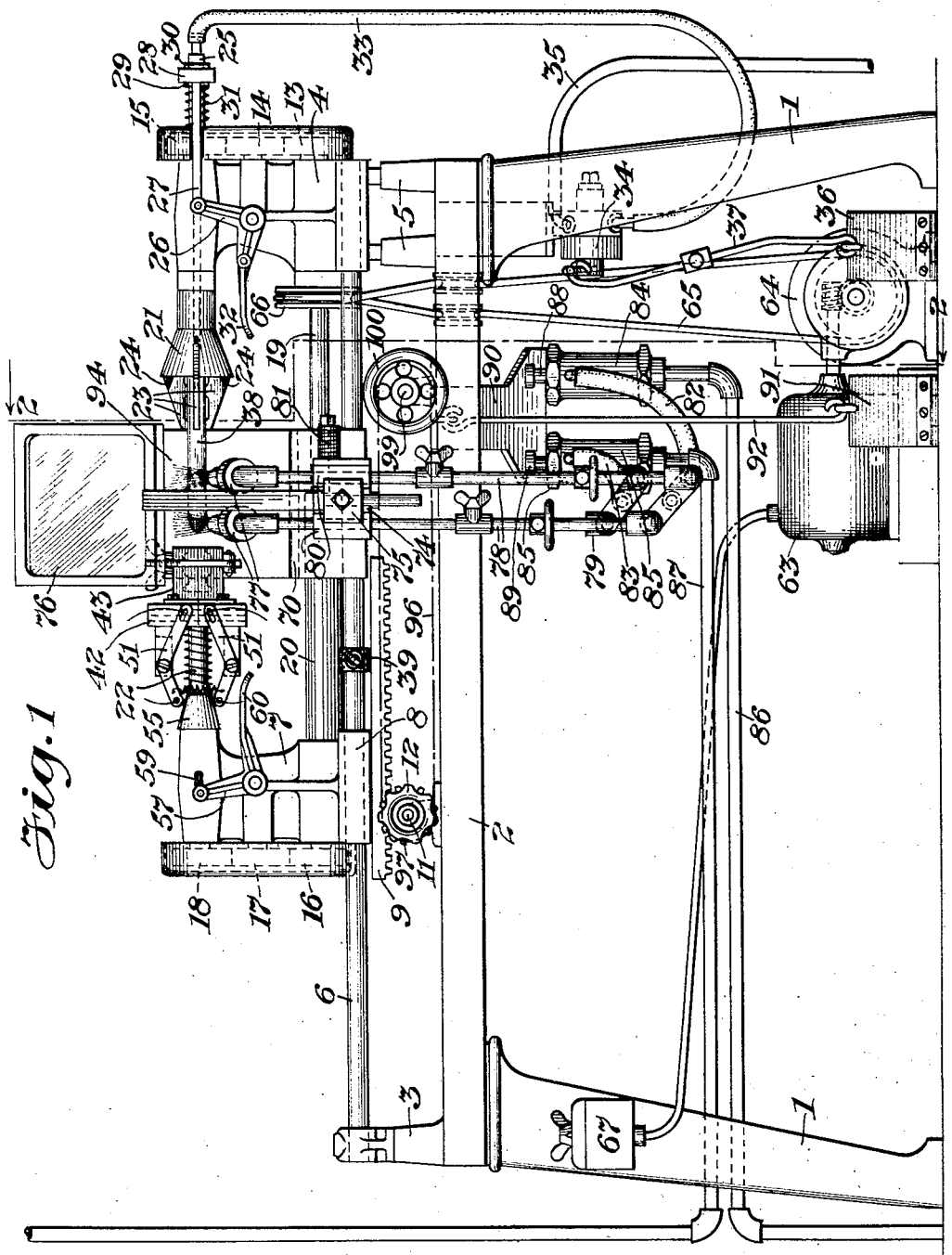

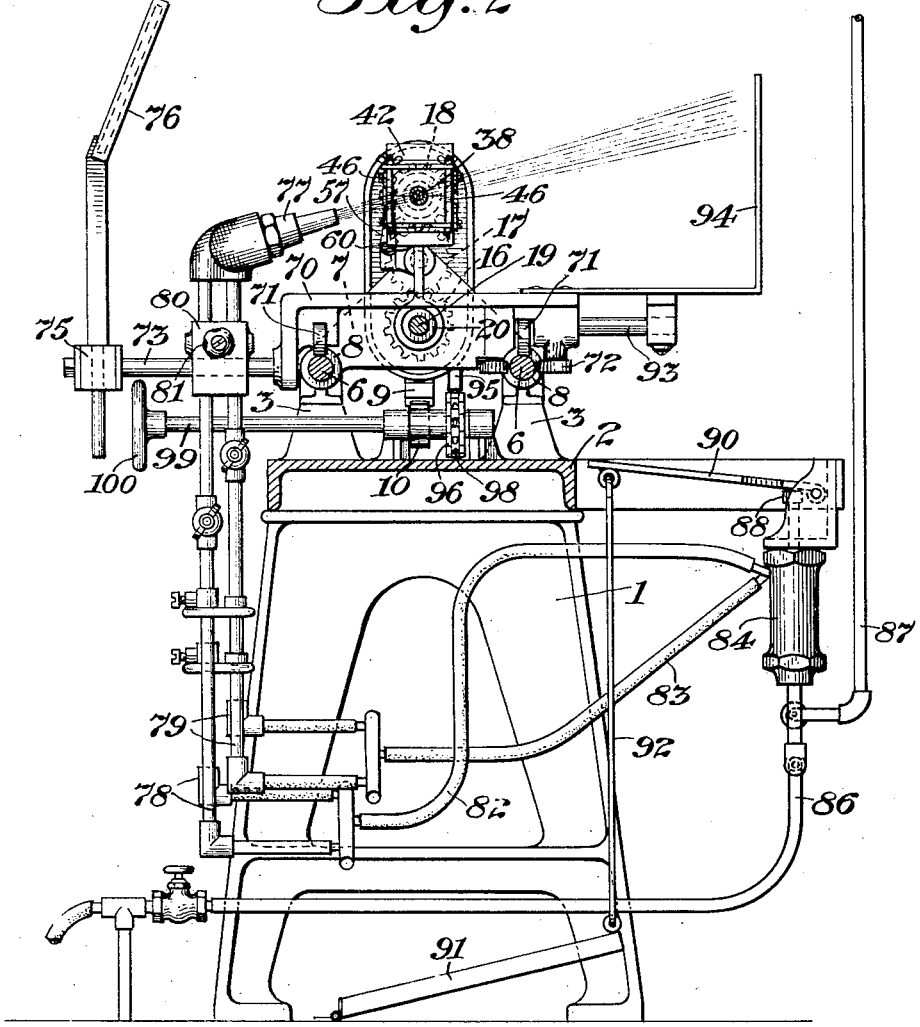
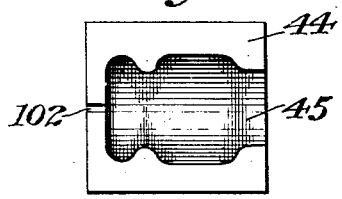
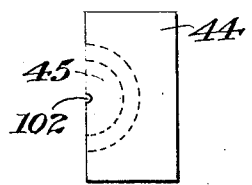

1,897,640

UNITED STATES PATENT OFFICE

GEORGE A. MILLAR, OF RIDGEFIELD PARK, NEW JERSEY, ASSIGNOR TO GENERAL ELECTRIC VAPOR LAMP COMPANY, OF HOBOKEN, NEW JERSEY, A CORPORATION OF NEW JERSEY

APPARATUS FOR WORKING FUSED SILICA

Application filed December 27, 1928. Serial No. 328,687.

The present invention relates to apparatus for working fused silica.

The particular object of the invention is to provide apparatus for blowing fused silica into a mold whereby shapes of desired configuration may be obtained. Other objects and advantages of the invention will appear from the following description of a machine embodying the invention or from an inspection of the accompanying drawings.

For more than a quarter of a century fused silica has been in use for various purposes, but throughout this entire time no way has been devised to produce shapes thereof of desired configuration other than by hand. As is well known this hand working of fused silica is a slow, tedious process which only a worker of great skill and experience can successfully perform, due to the fact that fused silica is the most difficultly workable of all the vitreous materials known, being normally worked at temperatures on the order of 2000° C. By this hand method the material is repeatedly heated, being blown and shaped in a series of small steps until the desired form has been produced. Since fused silica rapidly volatilizes at the temperature at which it is worked a considerable proportion of the material has been lost during the many working heats hereof required by the hand blowing method. As a result not only of the skilled labor which is required, but also of the slowness of the operation and the excessive loss of costly material the formation of shaped bodies of fused silica has been an extremely expensive process. And in spite of the greatest care and skill undesirable variations in the finished product could not be avoided.

I have found that by using a suitable mold the fused silica may be blown to the desired shape after only one heating to the working temperature, thereby greatly reducing the loss of material. This process when performed with the apparatus herein disclosed may be performed by unskilled labor turning out forms of fused silica ten to twenty times as fast as the same form could be produced by hand, and a more uniform product is also obtained.

In the drawings there is shown by way of illustration one form of apparatus for carrying out my invention, as applied to forming a portion of a mercury arc lamp, in which Fig. 1 is a front elevation of the machine,
Fig. 2 is a section taken on the line 2—2 of Fig. 1,
Figs. 3 and 4 are respectively top and side views of the molds and associated mechanism,
Figs. 5 and 6 are respectively face and end views of one of the two similar mold sections,
Fig. 7 is a view of the fused silica as it is introduced in the machine, and
Fig. 8 is a view of the product of my new method and apparatus.

In these drawings the legs 1 support a bedplate 2, which in turn carries supports 3 at one end and a block 4 mounted above the bedplate 2 on posts 5 at the other end thereof. Rods 6 are carried by the supports 3 at one end and the block 4 at the other end. A block 7 is slidably mounted on said rods 6 by means of bosses 8. A longitudinal rack 9 secured to the lower side of said block 7 cooperates with a pinion 10 secured to shaft 11, mounted on said bedplate 3, to secure longitudinal movement of said block 7 along said rods 6. Said shaft 11 carries at its front end a handwheel 12 for the operation thereof. An adjustable stop 39 is mounted on the front rod 6, and serves to engage the corresponding boss 8 to limit the travel of said block 7.

Block 4 carries a train of gears 13, 14, 15 and block 7 carries a similar train of gears 16, 17, 18 on a line extending vertically between the rods 8. Gears 13 and 16 are connected together by means of an extensible shaft comprising shaft 19, secured to gear 13, and the hollow shaft 20, secured to gear 16, telescoped thereon, said shafts 19 and 20 being splined together so as to provide proper driving connection therebetween, and at the same time permitting longitudinal movement of the one with respect to the other. Gear 15 carries a chuck sleeve 21 and gear 18 carries a shaft 22 which are axially aligned and extend toward each other. Jaws 23 have grooves 24 therein which engage with slots (not shown) in the tapered chuck sleeve 21, whereby said jaws are moved toward or away from each other as a central hollow spindle 25 which engages said jaws is moved longitudinally. Bell cranks 26, pivotally mounted on said block 4, are connected by links 27 to transverse bar 28, through which passes the spindle 25. Collars 29 and 30, fastened to spindle 25 on either side of transverse bar 28 provide a means of engagement between said members 25 and 28. A compression spring 31 mounted on spindle 25 with one end bearing against gear 15 and the other against collar 29 serves to keep the chuck jaws 23 in a closed position except when handle 32 on bell crank 26 is actuated to move said jaws 23 to the open position against the bias of said spring 31. At its outer end said hollow spindle 25 makes a swivel connection with hose 33, the other end of which is connected to air valve 34, mounted below the bedplate 3. Air is supplied to said valve 34 from a suitable source by a hose 35. A pedal 36, acting on said valve 34 through the extensible rod 37, serves to permit the passage of air through said valve 34 when depressed. An annular stopper (not shown) of fibrous material is located within the jaws 23 of the chuck at the end of hollow spindle 35, and serves to make the connection between the fused silica tube 38 substantially air tight.

Attached to the inner end of the shaft 22 is a block 40 having a groove 41 in each side thereof. Slidably mounted on said block 40 by means of said grooves 41 are the blocks 42, to which are attached the similar box like structures 43 each of which contains a mold member 44 of graphite or other material having no deleterious effect on the softened fused silica, the depressions 45 therein registering with each other to form a mold of desired shape. Means for clamping the two portions 44 of said mold together is provided in the form of two bolts 46 which are pivotally mounted on one of the mold containers 43, the wing nuts 47 thereon engaging with the transverse bar 48 attached to the other mold container 43. For convenience the ends of bar 48 have slots 49 therein to receive the bolts 46. Near each of its ends said block 40 carries a U-shaped member 50, each of the legs thereof pivotally supporting a lever 51 near the mid-point thereof. Each of said levers 51 has a slot 52 near one end thereof which engages with one of the pins 53 on the sides of blocks 42. Each pair of levers 51 associated with one of the blocks 42 has its opposite ends connected by one of the rods 54. A conical collar 55 mounted on the end of a sleeve 56 which slides on the shaft 22 is adapted to engage each of said rods 54 when moved toward said block 40, thereby forcing said mold members 44 together and automatically centering said mold in axial alignment with the chuck 21. Bell crank 57 pivotally mounted on the block 7 has at the end of one arm thereof a pin 58 which passes through a slot 59 to engage said sleeve 56, while the other arm is provided with a handle 60. A compression spring 61 bearing against collar 55 at one end and block 40 at the other biases said collar 55 to a non-operative position, while tension springs 62 between opposite pairs of levers 51 tend to separate the mold members 44.

A motor 63 supplies power through reduction gear 64 and belt 65 to pulley 66 mounted on shaft 19, thereby providing means for the rotation of the chuck 21 and the mold members 44. A switch 66 is provided for starting and stopping the motor 63, although suitable clutch mechanism might also be used to arrest the rotation of the machine. Carriage 70 is slidably mounted on rods 6, being supported thereon by rollers 71 and guided along said rods by the rollers 72. From the front of said carriage 70 extends a rod 73 which carries a small block 74 at an intermediate point and near the front end carries a second block 75 to which is attached the eye shield 76. Burners 77, directed toward a fused silica tube 38 held by the chuck jaws 23, are fed with gas and oxygen through pipes 78 and 79, respectively. The pipes 78, 79 for each burner pass through a block 80, one of said blocks 80 being pivotally mounted on either side of block 74 and held in frictional engagement therewith by the compression spring 81, so that the burners 77 may be oscillated in a vertical plane by the operator, using the pipes 78, 79 as a handle, but will remain in whatever position left. Said pipes 78 and 79 are respectively connected through tubes 82 and 83 to the cylinders 84 and 85 of a mixing valve, gas and oxygen being supplied to said cylinders from convenient sources through pipes 86 and 87 respectively. Plungers 88 and 89, which are slidable in cylinders 84 and 85 respectively, in their normal position cut off all but a slight flow of gas and oxygen, but when depressed by lever 90 allow an increased flow of gas and oxygen in proper proportions, to said burners 77. Since these valves are well known in the art further description is deemed unnecessary. A pedal 91, operating through rod 92 on the lever 90, provides a convenient means for operating said mixing valve. From the back of said carriage 70 extends a rod 93 which carries a baffle 94 of asbestos or similar material for the protection of passersby. Depending from the under side of said carriage 70 is a projection 95 to which is attached an endless chain 96. Said chain 96 passes over sprocket 97, loosely mounted on shaft 11 behind pinion 10 at one end, and over sprocket 98 secured to shaft 99 at the other end. Said shaft 99 is mounted on bedplate 3 and carries handwheel 100 at its front end.

Each of the mold members 44 has a groove 102 on the face thereof extending from the inner end to the depression 45 to serve as a vent for air trapped in the mold as the fused silica tube 38 is blown therein.

In the use and operation of the above described machine, the machine being at rest and the mold members 44 opened, said mold members 44 are brought together and centered by depressing handle 60, the two members then being clamped together by means of bolts 46 and wing nuts 47, after which the handle 60 may be released since frictional engagement of blocks 42 with block 40 will maintain the mold in the desired position. Chuck jaws 23 are then opened by means of handle 32 and the open end of a closed silica tube 38 is inserted therein, the mold members 44 being withdrawn by means of the handwheel 12 to provide the necessary clearance. Rotation of the tube 38 and of the mold members 44 is then started by closing switch 67. Stop 39 is then adjusted so that the movement of the mold toward the fused silica tube 38 will be arrested when the end of the fused silica approaches the bottom of the mold. Burners 77 are then adjusted by rotation on their pivot and by means of the handwheel 100 so as to direct their flames on the closed end of fused silica tube 38, and the flames are raised by means of the pedal 91, the fused silica being heated until it has become softened. The pedal 91 is then released and the mold members 44 are advanced by means of handwheel 12 until the boss 8 strikes the stop 39, when the valve 34 is opened by means of pedal 36, allowing air under pressure to enter the fused silica tube. The softened portion of said tube 38 is forced into contact with the walls of the mold member 44 by this increased air pressure, forming the enlarged section 103 of the desired shape therein. The fused silica cools almost instantly when in contact with the mold, so that shortly after the air pressure has been applied rotation of the machine is arrested by opening switch 67, after which the bolts 46 are removed from clamping position and the parts 44 of the mold separated. The chuck jaws 23 are then opened by means of handle 32 and the fused silica tube 38 removed from the machine. Another fused silica tube 38 can then be inserted in the machine and the series of operations repeated.

The time occupied in carrying out the foregoing operations is exceedingly short, and the bringing of the fused silica to the critical softening temperature at which it can be blown in the mold takes up the major portion of the time. Furthermore, the desired form is completely attained after only one application of heat. The operation of this machine is so simple that workers unskilled in fused silica working can easily turn out perfect shapes many times more rapidly than could be done by expert hand workers using the old methods of working fused silica.

It is to be understood that molds of other shapes and materials than the one illustrated and described could be utilized, and that the form of the machine herein illustrated could be departed from, without departing from the spirit of the invention.

I claim:

1. In a machine for working fused silica, in combination, a work holding means and a mold axially aligned therewith, said mold being separable into a plurality of parts, means for synchronously rotating said work holding means and said mold, means for softening a portion of a hollow fused silica body held by said work holding means, means for inserting the softened portion of said fused silica body in said mold, means for increasing the air pressure in said hollow body, and means for separating the parts of said mold to allow removal of said fused silica body therefrom.

2. In a machine for working fused silica, in combination, a work holding means and a mold axially aligned therewith, said mold being separable into a plurality of parts, means for synchronously rotating said work holding means and said mold, means for softening a portion of a hollow fused silica body held by said work holding means, means for inserting the softened portion of said fused silica body in said mold, means for increasing the air pressure in said hollow body, means for separating the parts of said mold to allow removal of said fused silica body therefrom, and means for reforming said mold from said parts.

3. In a machine for working fused silica, in combination, a work holding means and a mold axially aligned therewith, said mold being separable into a plurality of parts, means for synchronously rotating said work holding means and said mold, means for softening a portion of a hollow fused silica body held by said work holding means, means for inserting the softened portion of said fused silica body in said mold, means for increasing the air pressure in said hollow body, means for separating the parts of said mold to allow removal of said fused silica body therefrom and means for reforming said mold in said axial alignment with said work holding means.

4. In a machine for working fused silica, in combination, a work holding means, a mold separable into a plurality of parts, means for uniformly softening a portion of a hollow fused silica body held by said work holding means, means for inserting the entire softened portion of said fused silica body in said mold, means for increasing the air pressure in said hollow body, and means to assemble the parts of said mold comprising arms attached to the parts of said mold, a shaft in axial alignment with said work holding means, and a conical member slidable along said shaft engaging said arms, said arms being pivotally supported by said shaft.

Signed at Hoboken in the county of Hudson and State of New Jersey this 26th day of December, A. D. 1928.

GEORGE A. MILLAR.